8,689,372
Patented Sept. 5, 1972

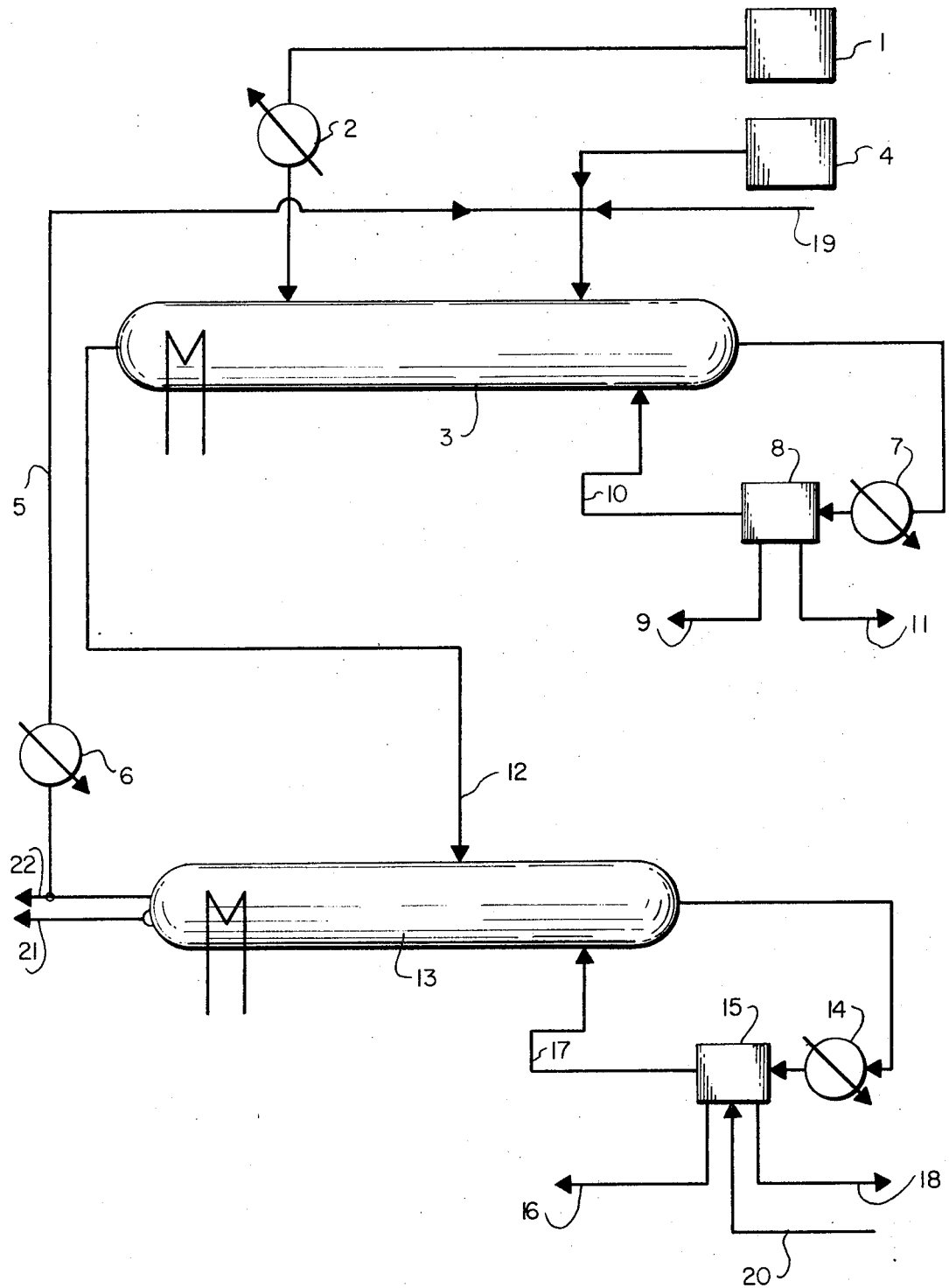

3,689,372
PROCESS FOR SEPARATING 2-CHLORO-1,3-BUTA-
DIENE BY EXTRACTIVE DISTILLATION WITH
DIMETHYLSULFOXIDE
Seiroku Sugano, Tokyo, and Tomio Arai, Seinoshin
Hayami, Sadao Watanabe, Shigeru Fujishiro, and Takeo
Ono, Kanagawa, Japan, assignors to Chiyoda Kako
Kensetsu K.K., and Denki Kagaku Kogyo K.K.
Filed Jan. 7, 1971, Ser. No. 104,630
Claims priority, application Japan, Jan. 7, 1970,
45/2,121
Int. Cl. B01d 3/40; C07c 21/20
U.S. Cl. 203—53                                13 Claims

ABSTRACT OF THE DISCLOSURE

A process is provided for separating 2-chloro-1,3-butadiene, characterized by extractive distillation of a mixture comprising 2-chloro-1,3-butadiene and one or more chlorinated hydrocarbons, the boiling point thereof being close to that of 2-chloro-1,3-butadiene, with dimethyl sulfoxide alone or dimethyl sulfoxide containing water up to about 10 percent by weight as a solvent. The process of this invention is especially useful for separating 2-chloro-1,3-butadiene from a chlorinated hydrocarbon mixture which contains mainly 2-chloro-1,3-butadiene and trans-2-chloro-2-butene and/or 2-chloro-1-butene.

BACKGROUND OF THE INVENTION

When producing 2-chloro-1,3-butadiene from 2,3-dichloro-butane or 2-chloro-2-butene by chemical reaction, not only 2-chloro-1,3-butadiene (B.P.:59.4° C.), 2-chloro-2-butene (B.P.:cis-form 67° C., trans-form 62.8° C.) and 2-chloro-1-butene (B.P.:58.5° C.) but also a mixture which contains chlorinated hydrocarbons in addition to the above-mentioned substances is obtained. It is comparatively easy by a conventional distillation process to separate from this mixture, a mixture which mainly contains 2-chloro - 1,3 - butadiene, trans - 2 - chloro-2-butene and 2-chloro-1-butene. However, it is extremely difficult from an economical and technical point of view to separate 2-chloro-1, 3-butadiene from the mixture comprising 2-chloro-1,3-butadiene and trans-2-chloro-2-butene and/or 2-chloro-1-butene, since the boiling points of these substances are close to each other.

It is known that an extractive distillation process with a non-volatile solvent is used for the separation of such a mixture as mentioned above whose constituents' boiling points are close to each other. An extractive distillation process using normal heptane or isooctane as a solvent for the separation of 2-chloro-1,3-butadiene from a mixture comprising 2-chloro-1,3-butadiene and trans-2-chloro-2-butene is known from Japanese Pat. No. 505,592 (Patent Publication No. 9,130/1967). Normal heptane or isooctane, used in this process as a solvent, is not highly selective so that its solvent ratio becomes higher in the extractive distillation process.

In the extractive distillation process in which normal heptane or isooctane is used, it it not possible to separate by a single distillation 2-chloro-1-butene from 2-chloro-1,3-butadiene from the mixture comprising 2-chloro-1,3-butadiene and trans-2-chloro-2-butene and/or 2-chloro-1-butene.

SUMMARY

As a result of researches directed at the improvement of the above mentioned points, the inventors have found that it is possible to separate in a highly selective manner 2-chloro-1,3-butadiene from the mixture which comprises 2-chloro-1,3-butadiene and trans-2-chloro-2-butene and/or 2-chloro-1-butene by using dimethyl sulfoxide or dimethyl sulfoxide containing up to about 10 weight percent of water (hereinafter referred to as "the solvent of the present invention") which has an affinity for 2-chloro-1,3-butadiene, as a solvent for the extractive distillation.

DETAILED DESCRIPTION

According to the present invention, it is possible to distill trans-2-chloro-2-butene and/or 2-chloro-1-butene from the top of an extractive distillation column as well as to take out 2-chloro-1,3-butadiene, which is dissolved in the solvent, from its bottom, by carrying out extractive distillation with the solvent of the invention which is present in 1.5 times, at least, to 10 times as much as the liquid volume of the mixture comprising 2-chloro-1,3-butadiene and trans-2-chloro-2-butene and/or 2-chloro-1-butene. 2-chloro-1,3-butadiene can be stripped from the solvent in the second distillation column, which is installed separately, and thus collected at high purity from its top as a distillate.

That is to say, it is possible according to the process of the present invention to effectively separate 2-chloro-1,3-butadiene, with a small quantity of solvent and reflux and a small number of separation stages. Furthermore, it is also possible according to the process of the invention to separate by a single distillation with ease 2-chloro-1-butene from 2-chloro-1,3-butadiene, which has normally been impossible using the conventional process, that is, the process using normal heptane or isooctane as a solvent.

As the boiling point of the solvent obtained by adding water to dimethyl sulfoxide (147° C. for dimethyl sulfoxide with 10 weight percent of water) is lower than that of dimethyl sulfoxide (189° C.), the use of the solvent obtained by adding up to about 10 weight percent of water to dimethyl sulfoxide makes it possible to carry out the process of the invention at a relatively low temperature, which is particularly effective for preventing the thermal polymerization of 2-chloro-1,3-butadiene. Also the selectivity of the solvent is improved by the addition of water. A solvent containing more than 10 weight percent of water is not desirable, since it reduces the efficiency of the column.

According to the process of the present invention, even in the case in which a small quantity of water is mixed with the mixture comprising 2-chloro-1,3-butadiene and trans-2-chloro-2-butene and/or 2-chloro-1-butene, the separation of 2-chloro-1,3-butadiene and dehydration can be achieved at the same time by dissolving moisture in the solvent.

The mixture, which mainly contains 2-chloro-1,3-butadiene and trans-2-chloro-2-butene and/or 2-chloro-1-butene may also contain a small quantity of cis-2-chloro-2-butene and/or 3-chloro-1-butene; but it is preferable to pretreat the mixture so that it practically does not contain cis-2-chloro-2-butene or 3-chloro-1-butene. In separating the mixture comprising 2-chloro-1,3-butadiene and trans-2-chloro-2-butene and/or 2-chloro-1-butene, and cis-2-chloro-2-butene directly by the process of the present invention, 2-chloro-1,3-butadiene of high purity can be obtained by distilling 2-chloro-1,3-butadiene and cis-2-chloro-2-butene mixed therewith from the top of the second distillation column and by treating such a mixture in a separately installed distillation column.

The present invention will be explained in detail in connection with the accompanying drawing, which is a flow sheet of the distillation process of the invention.

The chlorinated hydrocarbon mixture, which comprises 2-chloro-1,3-butadiene and trans-2-chloro-2-butene and/or 2-chloro-1-butene, is supplied from a storage tank 1 to an extractive distillation column 3, after being preheated in a preheater 2. A solvent from a storage tank 4 is sent to the extractive distillation column 3 through a conduit 5. In the extractive distillation column 3, 2-chloro-1,3-butadiene and cis-2-chloro-2-butene are extracted by the solvent and taken out from the bottom of the column. On the other hand, trans-2-chloro-2-butene and/or 2-chloro-1-butene are distilled from the top of the column, liquefied by a cooler 7, stored in a reflux storage tank 8 and discharged through a conduit 9. Part of the distilling liquid thus liquefied is passed back to the top of the column by a conduit, as a refluxed liquid. 2-chloro-1,3-butadiene etc., which are discharged from the bottom of the column together with the solvent, are supplied to the second distillation column 13 by a conduit 12. 2-chloro-1,3-butadiene is stripped from the solvent in the second distillation column 13, distilled from the top of the column, liquefied by a cooler 14, stored in a reflux storage tank 15 and collected through a conduit 16. Part of the liquid thus liquefied is stabilized by a polymerization-inhibitor and passed back to the top of the column through a conduit 17, as a refluxed liquid. The liquid discharged from the bottom is passed through the conduit 5 to the extractive distillation column 3 where it is re-used as the solvent, after being cooled by the intermediate cooler 6. Part of the bottoms is discharged through a conduit 22 to the solvent purifying apparatus (not shown) for purifying the solvent. A conduit 21 is used for collecting heavy liquid. For inhibiting the polymerization of 2-chloro-1,3-butadiene, n-nitroso-n-monomethylaniline and tert-butyl catechol are added as the polymerization-inhibitor through the conduits 19 and 20 at the rate of 1,000 p.p.m. per hour respectively. And these distilling operations are carried out under pressures ranging from reduced to atmospheric. When operated under reduced pressure, the reduction of pressure is achieved by means of an evacuator through the conduits 11 and 18. For the effective separation of 2-chloro-1,3-butadiene from the chlorinated hydrocarbon mixture which mainly contains 2-chloro-1,3-butadiene and trans-2-chloro-2-butene and/or 2-chloro-1-butene, the quantity of the solvent to be used may be 1.5 to 10 times by volume as much as that of the mixture, or more preferably 2 to 5 times by volume as much.

Advantages of the process of the present invention over the conventional process will be explained hereunder in connection with the comparative example. The excellence of the process according to the invention may be clearly understood when Example 3 and comparative Example 1 are examined. That is, the process of the invention makes it possible to separate 2-chloro-1,3-butadiene of high purity in a high yield, with a lower extractive distillation column and a smaller quantity of solvent and reflux than those used in the conventional process. Using equipment as described hereabove according to the present invention, it is possible by the process of the invention to separate 2-chloro-1-butene from 2-chloro-1,3-butadiene; while by the conventional processes it cannot be done at all.

In the following examples and comparative example, the composition of materials, the purity of products, etc. used in the examples and the comparative example are those which were obtained by analysis using gas chromatography. Trace amounts of moisture were measured by a micro moisture measuring device.

Example 1

A mixture, comprising 60 weight percent of 2-chloro-1,3-butadiene, 35 weight percent of trans-2-chloro-2-butene and 5 weight percent of 2-chloro-1-butene and stabilized by a polymerization-inhibitor, was supplied at a height of 2 m. in a 4 m. high extractive distilling column 3 filled with a spiral coil packing, at a rate o 500 g. (about 527 ml.) per hour. This mixture was dissolved in dimethyl sulfoxide, which was supplied at a height of 3.5 m. in the extractive distillation column 3 at a rate of 1,500 ml. per hour, and then distilled and separated. Trans-2-chloro-2-butene and 2-chloro-1-butene were distilled from the top of the column. The quantity of 2-chloro-1,3-butadiene contained in a mixed solution of trans-2-chloro-2-butene and 2-chloro-1-butene, which was collected under conditions in which the temperature and pressure at the top of of the column were 12° C. and 100 mm. Hg abs. and the reflux ratio was 1, was less than 0.5 weight percent. 2-chloro-1,3-butadiene was extracted by dimethyl sulfoxide, the solvent, and then discharged from the bottom of the extractive distillation column 3 and transmitted to the second distillation column 13. This 2-chloro-1,3-butadiene was fractionally distilled in the 1 m. high second distillation column filled with a spiral coil packing. 2-chloro-1,3-butadiene having a purity of over 99.9 weight percent was obtaned from the top of the column under conditions in which the temperature and pressure at the top of the column were 10° C. and 100 mm. Hg abs. and the reflux ratio was over 0.5. Dimethyl sulfoxide taken out from the bottom of the second distillation column 13 was used again in the extractive distillation column 3, after being cooled down to 20° C. on the way. The distillation yield of 2-chloro-1,3-butadiene was about 98 percent.

Example 2

In the same apparatus that was used in Example 1, a stabilized mixture, comprising 90 weight percent of 2-chloro-1,3-butadiene and 10 weight percent of trans-2-chloro-2-butene and containing about 1,000 p.p.m. of water, was supplied to the extractive distillation column 3 at a height of 1.5 m., at a rate of 500 g. per hour, and then extractively distilled with dimethyl sulfoxide which was supplied from the upper part of the distillation column at a rate of 1,500 ml. of per hour.

Trans-2-chloro-2-butene having a purity of over 99.5 weight percent was collected from the top of the extractive distillation column 3 under conditions in which the temperature and pressure at the top of the column were 12° C. and 100 mm. Hg abs. and the reflux ratio was over 1. 2-chloro-1,3-butadiene extracted by dimethyl sulfoxide was distilled from the top of the second distillation column 13. 2-chloro-1,3-butadiene, collected under conditions in which the temperature and pressure at the top of the column were 10° C. and 100 mm. Hg abs. and the reflux ratio was over 0.5, had a purity of over 99.9 weight percent and was practically in an anhydrous state.

Dimethyl sulfoxide, which had been freed of 2-chloro-1,3-butadiene, was re-circulated and used in the extractive distillation column 3. The distillation yield of 2-chloro-1,3-butadiene was about 98 percent.

Example 3

In the same apparatus that was used in Example 1, a mixture comprising 95 weight percent of 2-chloro-1,3-butadiene, 4 weight percent of trans-2-chloro-2-butene, 0.6 weight percent of 2-chloro-1-butene and 0.4 weight percent of cis-2-chloro-2-butene was supplied at a rate of 500 g. per hour, and then extractively distilled with dimethyl sulfoxide which was supplied at a rate of 1,500 ml. per hour.

2-chloro-1,3-butadiene having a purity of 99.6 weight percent, the impurities of which mainly comprising cis- 2-chloro-2-butene, was collected from the top of the second distillation column 13 under conditions in which the temperature and pressure at the top of the column were 10° C. and 100 mm. Hg abs. and the reflux ratio was over 0.5. On the other hand, trans-2-chloro-2-butene and 2-chloro-1-butene, containing less than 0.5 weight percent of 2-chloro-1,3-butadiene, were distilled from the top of the extractive distillation column 3 under conditions in which the temperature and pressure at the top of the column were 12° C. and 10 mm. Hg abs. and the reflux ratio was 2.5. The distillation yield of 2-chloro-1,3-butadiene was about 98 percent.

Example 4

In the same apparatus that was used in Example 1, a mixture comprising 60 weight percent of 2-chloro-1,3-butadiene and 40 weight percent of trans-2-chloro-2-butene and stabilized by a polymerization-inhibitor was supplied at a rate of 500 g. per hour, and then separated and purified with dimethyl sulfoxide containing about 10 weight percent of water, as an extractive distillation solvent.

The apparatus was operated while supplying the solvent at a rate of 1,500 ml. per hour. Trans-2-chloro-2-butene containing less than 0.5 weight percent of 2-chloro-1,3-butadiene was collected from the top of the extractive distillation column 3 under conditions in which the temperature and pressure at the top of the column were 44° C. and 400 mm. Hg abs. and the reflux ratio was over 1.

2-chloro-1,3-butadiene was distilled from the top of the second distillation column 13. 2-chloro-1,3-butadiene having a purity of over 99.9 weight percent was obtained under conditions in which the temperature and pressure at the top of the column were 40° C. and 400 mm. Hg abs. and the reflux ratio was over 0.5.

The solvent which had been freed of 2-chloro-1,3-butadiene in the second distillation column 13 was re-used in the extractive distillation column 3, after being cooled down to 50° C. on the way.

The distillation yield of 2-chloro-1,3-butadiene was about 98 percent.

Comparative example

A mixture, comprising 95 weight percent of 2-chloro-1,3-butadiene, 4 weight percent of trans-2-chloro-2-butene and 1 weight percent of 2-chloro-1-butene and stabilized by a polymerization inhibitor was supplied at a height of 3 m. into a 7 m. high extractive distillation column 3 filled wth a spiral coil packing, at a rate of 150 g. (about 160 ml.) per hour. This mixture was dissolved in normal heptane, which was supplied into the extractive distillation column 3 at a height of 6 m. at a rate of 2,500 ml. per hour, and then distilled and separated. And 2-chloro-1,3-butadiene was distilled from the top of the column, together with 2-chloro-1-butene. A distillate, collected under conditions in which the temperature and pressure at the top of the column were 60° C. and 760 mm. Hg abs. and the reflux ratio was 1, was comprised of 98.8 weight percent of 2-chloro-1,3-butadiene, 1.09 weight percent of 2-chloro-1-butene and 0.11 weight percent of trans-2-chloro-2-butene.

The bottoms comprising the solvent normal heptane and, as the other main constituents, trans-2-chloro-2-butene and 2-chloro-1,3-butadiene, which was taken out of the bottom of the extractive distillation column 3, was supplied to approximately the middle part of a 3 m. high second distillation column filled with a spiral coil packing.

The solvent normal heptane, which was recovered after having been freed of trans-2-chloro-2-butene and 2-chloro-1,3-butadiene through the top of the second distillation column 13, was taken out from the bottom of the column and passed through the conduit 5 to the extractive distillation column 3 for re-use, after being cooled down to 65 to 70° C. on its way.

A distillate, which was taken out of the top of the second distillation column under a condition in which the temperature and pressure at the top of the column were 64 to 65° C. and 760 mm. Hg abs. and the reflux ratio was 5.5, was comprised of 60 weight percent of trans-2-chloro-2-butene and 40 weight percent of 2-chloro-1,3-butadiene.

The quantity of heavy liquid intermittently taken out through a conduit 21 was 20 to 30 g. per 5 hours.

The distillation yield of 2-chloro-1,3-butadiene was 95 percent.

It was not possible to separate 2-chloro-1,3-butadiene and 2-chloro-1-butene by the method and apparatus described in this comparative example.

We claim:

1. In a process for separating 2-chloro-1,3-butadiene by extractive distillation from a mixture of 2-chloro-1,3-butadiene and at least one other chlorinated hydrocarbon having a substantially similar boiling point the improvement comprising conducting the extractive distillation in the presence of a solvent consisting essentially of dimethyl sulfoxide.

2. The improvement according to claim 1 in which the dimethyl sulfoxide contains up to about 10 percent by weight water.

3. The improvement according to claim 1 in which dimethyl sulfoxide is used in an amount of 1.5 to 10 times by volume based upon the volume of said mixture.

4. The improvement according to claim 1 in which said mixture contains trans-2-chloro-2-butene.

5. The improvement according to claim 1 in which said mixture contains 2-chloro-1-butene.

6. A process for separating 2-chloro-1,3-butadiene from a mixture containing at least one other chlorinated hydrocarbon comprising:
   (a) supplying a mixture comprising 2-chloro-1,3-butadiene and at least one other chlorinated hydrocarbon, the boiling point of said hydrocarbon closely approximating that of 2-chloro-1, 3-butadiene, and dimethyl sulfoxide as a solvent for said mixture to a first distillation zone,
   (b) taking out a stream of 2-chloro-1,3-butadiene and those chlorinated hydrocarbons having an affinity for dimethyl sulfoxide with said solvent from the bottom of the first zone, while distilling those chlorinated hydrocarbons having little or no affinity for dimethyl sulfoxide, from the top of the first zone,
   (c) transferring the stream from the bottom of the first zone into a second distillation zone, and then,
   (d) distilling and recovering 2-chloro-1,3-butadiene from the top of the second zone, while discharging the solvent from the bottom of the second zone.

7. A process according to claim 5, in which the dimethyl sulfoxide contains water in an amount up to about 10 percent by weight.

8. A process for recovering 2-chloro-1,3-butadiene comprising:
   (a) supplying a mixture comprising 2-chloro-1,3-butadiene and at least one chlorinated hydrocarbon selected from the group consisting of trans-2-chloro-2-butene and 2-chloro-1-butene together wtih dimethyl sulfoxide as a solvent for said mixture to a first distillation zone,
   (b) taking out a stream of 2-chloro-1,3-butadiene with said solvent from the bottom of the first zone, while distilling the chlorinated hydrocarbon from the top of the first zone,
   (c) transferring said stream from the bottom of the first zone into a second distilaltion zone, and then,
   (d) distilling and recovering 2-chloro-1,3-butadiene from the top of the second zone, while discharging the solvent from the bottom of the second zone.

9. A process according to claim 8, in which the dimethyl sulfoxide contains water in an amount of up to about 10 percent by weight.

10. A process according to claim 8 in which said solvent is used in an amount from 1.5 to 10 times by volume, based on the volume of said mixture.

11. A process according to claim 8 in which the solvent, discharged from the bottom of the second distillation zone, is recirculated to the first distillation zone.

12. A proecss according to claim 8 in which the mixture is pretreated in a preparatory distillation zone to remove cis-2-chloro-2-butene or 3-chloro-1-butene.

13. A process according to claim 12 in which the stream distilled from the top of the second zone is transferred to the preparatory distillation zone to remove cis-2-chloro-2-butene.

References Cited

UNITED STATES PATENTS

| 3,396,089 | 8/1968 | Sennewald et al. | 260—655 |
| 3,406,215 | 10/1968 | Holmquist | 260—655 |
| 3,275,531 | 9/1966 | Sennewald et al. | 260—655 |
| 3,050,573 | 8/1962 | Anderson et al. | 203—57 |

WILBUR L. BASCOMB, JR., Primary Examiner

U.S. Cl. X.R.

203—57, 84; 260—655